(12) United States Patent
Alcoser et al.

(10) Patent No.: US 10,653,111 B2
(45) Date of Patent: May 19, 2020

(54) WILDLIFE BAITING ASSEMBLY

(71) Applicants: Thomas Alcoser, Converse, TX (US); Candace Roland, Converse, TX (US)

(72) Inventors: Thomas Alcoser, Converse, TX (US); Candace Roland, Converse, TX (US)

(*) Notice: Subject to any disclaimer, the term of this patent is extended or adjusted under 35 U.S.C. 154(b) by 438 days.

(21) Appl. No.: 15/473,119

(22) Filed: Mar. 29, 2017

(65) Prior Publication Data

US 2018/0279579 A1 Oct. 4, 2018

(51) Int. Cl.
*A01K 5/02* (2006.01)
*A01M 31/00* (2006.01)
*H02J 7/35* (2006.01)
*H04N 5/225* (2006.01)
*H04N 7/18* (2006.01)
*H02S 20/20* (2014.01)
*H04N 5/247* (2006.01)

(52) U.S. Cl.
CPC .......... *A01K 5/0291* (2013.01); *A01K 5/0225* (2013.01); *A01M 31/002* (2013.01); *A01M 31/008* (2013.01); *H02J 7/35* (2013.01); *H02S 20/20* (2014.12); *H04N 5/2257* (2013.01); *H04N 7/18* (2013.01); *H04N 7/185* (2013.01); *H04N 5/2256* (2013.01); *H04N 5/247* (2013.01)

(58) Field of Classification Search
CPC .......... A01K 5/00; A01K 5/02; A01K 5/0225; A01K 5/0291
See application file for complete search history.

(56) References Cited

U.S. PATENT DOCUMENTS

| 4,986,220 A | * | 1/1991 | Reneau | A01K 5/02 119/57.91 |
| 5,299,529 A | * | 4/1994 | Ramirez | A01K 5/0291 119/51.11 |
| 5,782,201 A | * | 7/1998 | Wells | A01K 5/02 119/56.1 |
| 6,067,933 A | * | 5/2000 | Cason | A01K 39/0125 119/52.1 |
| 6,082,300 A | * | 7/2000 | Futch | A01K 5/02 119/51.11 |
| 6,273,027 B1 | * | 8/2001 | Watson | A01K 15/02 119/712 |
| 6,920,841 B2 | * | 7/2005 | Meritt | A01K 1/10 119/51.01 |

(Continued)

FOREIGN PATENT DOCUMENTS

WO WO2006089244 8/2006

*Primary Examiner* — Michael H Wang

(57) ABSTRACT

A wildlife baiting assembly for attracting game to a desired location includes a cylinder that has a top and a bottom, which both are open. The cylinder is tapered proximate to the bottom and defines a cone and a reservoir. A base that is coupled to the cylinder is positioned to elevate the cylinder above a surface upon which the base is disposed. A battery, which is rechargeable from a plurality of solar cells, is coupled to the cylinder. A disbursing unit, which is coupled to the cylinder and positioned below the cone, is operationally coupled to the battery. A plurality of sensors is coupled to the cylinder and is configured to detect motion proximate to the cylinder. The disbursing unit is configured to broadcast the feed that drops from the cylinder to an area proximate to the base, at specified intervals and for specified lengths of time.

15 Claims, 5 Drawing Sheets

(56) References Cited

U.S. PATENT DOCUMENTS

Figure 1:
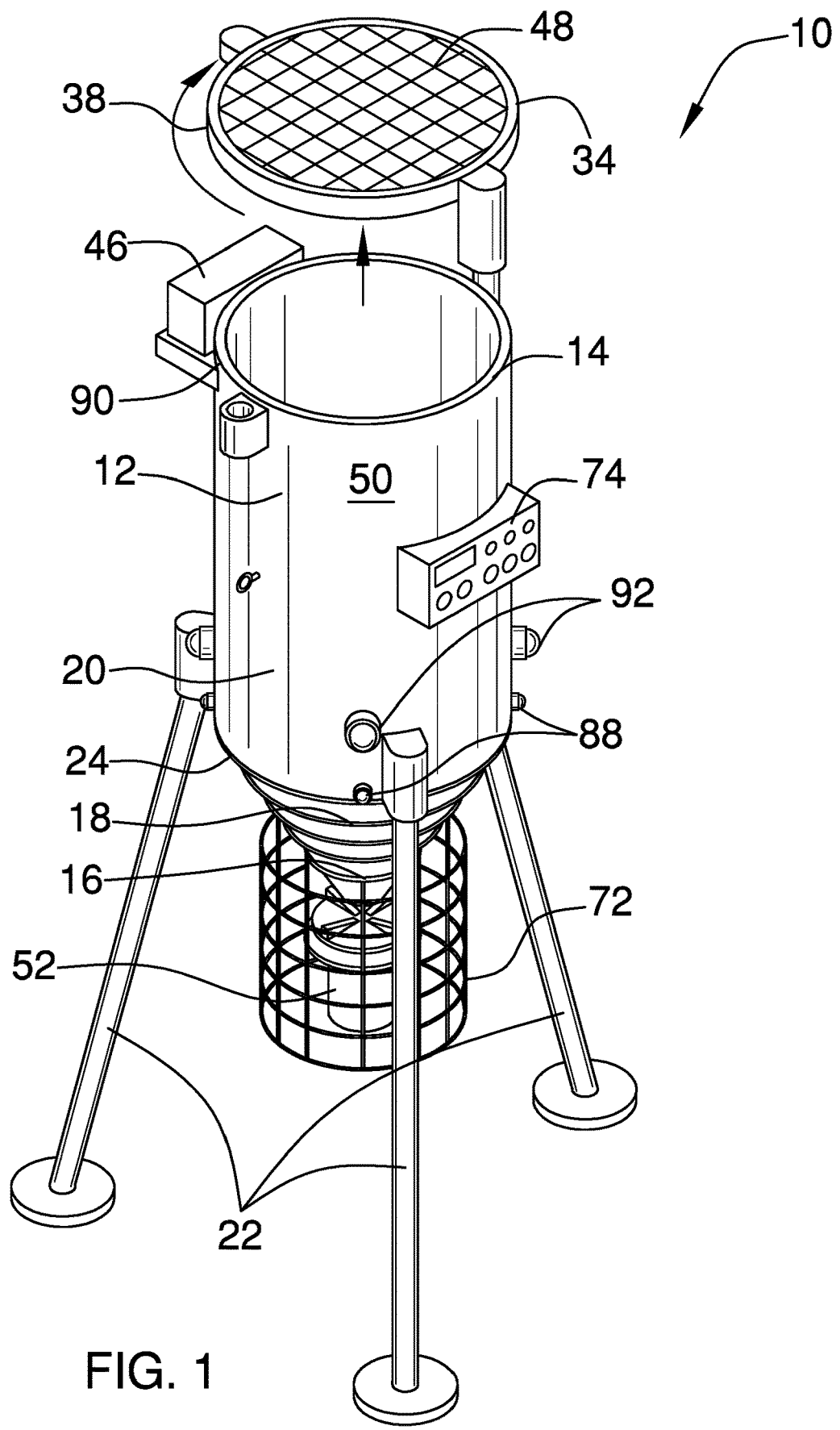

| | | | | |
|---|---|---|---|---|
| 7,222,583 | B2* | 5/2007 | Foster | A01K 5/0225 119/57.91 |
| 7,275,501 | B1 | 10/2007 | Laceky | |
| 7,331,308 | B1 | 2/2008 | Smith | |
| 7,513,216 | B2* | 4/2009 | Neckel | A01K 5/0114 119/51.01 |
| 8,096,265 | B1* | 1/2012 | Wisecarver | A01K 5/0225 119/56.1 |
| D691,770 | S | 10/2013 | Woller et al. | |
| 8,555,812 | B2 | 10/2013 | Nowacek | |
| 8,683,948 | B2* | 4/2014 | Gerke | A01K 5/0225 119/57.1 |
| 8,833,304 | B2* | 9/2014 | Whitsett | A01K 5/0225 119/57.92 |
| 10,034,452 | B2* | 7/2018 | Lowenthal | A01K 5/0114 |
| 2002/0108579 | A1* | 8/2002 | Borries | A01K 5/0233 119/52.1 |
| 2003/0019437 | A1* | 1/2003 | Fore | A01K 5/02 119/57.92 |
| 2005/0241587 | A1* | 11/2005 | Parrott | A01K 5/0291 119/51.12 |
| 2006/0249531 | A1* | 11/2006 | Litchfield | G07F 11/44 222/52 |
| 2009/0020073 | A1* | 1/2009 | Hansen | A01K 5/0291 119/51.11 |
| 2011/0297090 | A1* | 12/2011 | Chamberlain | A01K 5/0291 119/51.02 |
| 2015/0272079 | A1* | 10/2015 | Evans | A01K 5/0225 119/51.01 |
| 2015/0296768 | A1* | 10/2015 | Hays | H04W 4/70 340/573.2 |

* cited by examiner

WILDLIFE BAITING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to baiting assemblies and more particularly pertains to a new baiting assembly for attracting game to a desired location.

BRIEF SUMMARY OF THE INVENTION

An embodiment of the disclosure meets the needs presented above by generally comprising a cylinder that has a top and a bottom, which both are open. The cylinder is tapered proximate to the bottom and defines a cone and a reservoir. A base that is coupled to the cylinder is positioned to elevate the cylinder above a surface upon which the base is disposed. A battery, which is rechargeable from a plurality of solar cells, is coupled to the cylinder. A disbursing unit, which is coupled to the cylinder and positioned below the cone, is operationally coupled to the battery. A plurality of sensors is coupled to the cylinder and is configured to detect motion proximate to the cylinder. The disbursing unit is configured to broadcast the feed that drops from the cylinder to an area proximate to the base, at specified intervals and for specified lengths of time.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is an isometric perspective view of a wildlife baiting assembly according to an embodiment of the disclosure.

Figure 2:
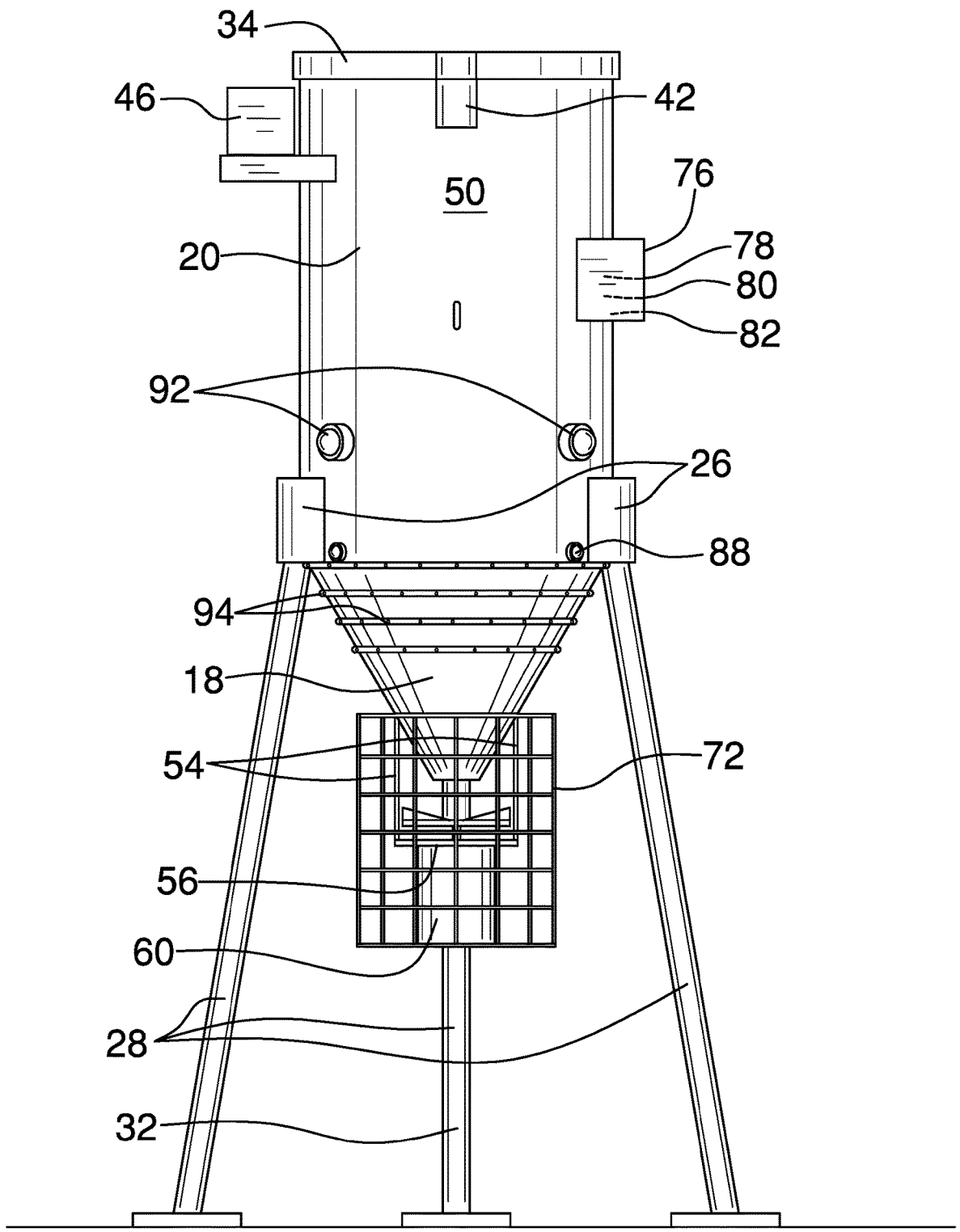
Figure 3:
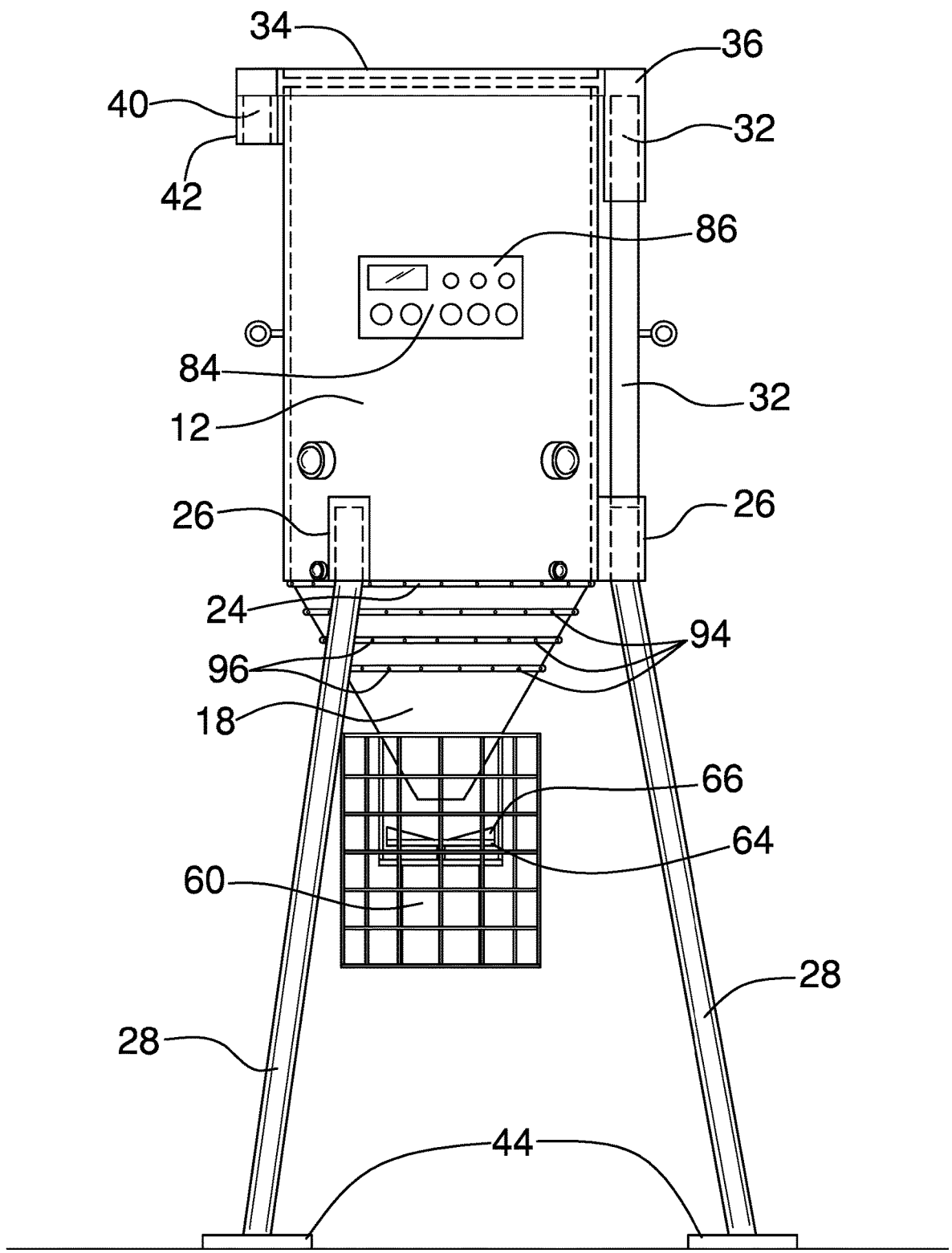
Figure 4:
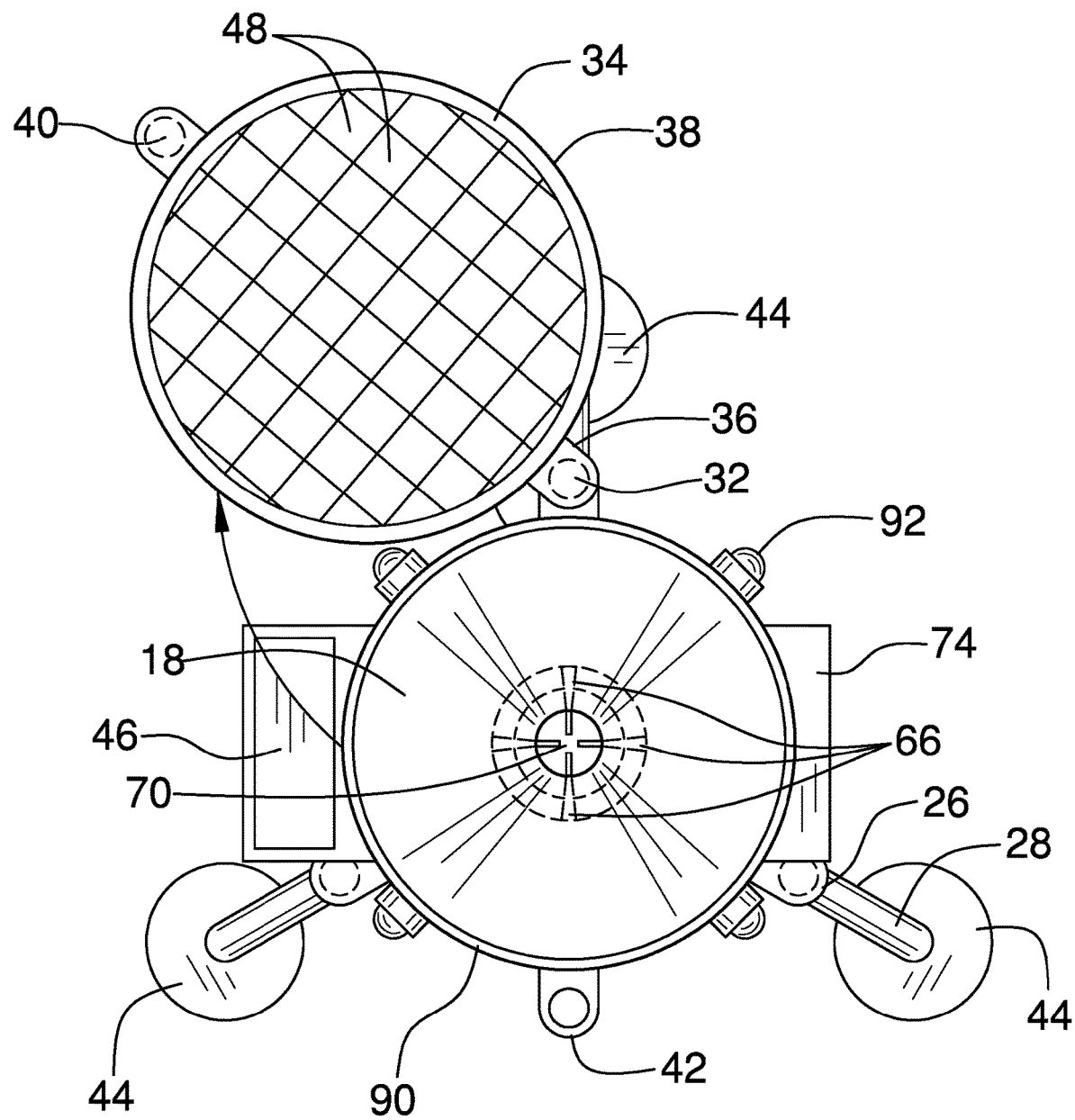
Figure 5:
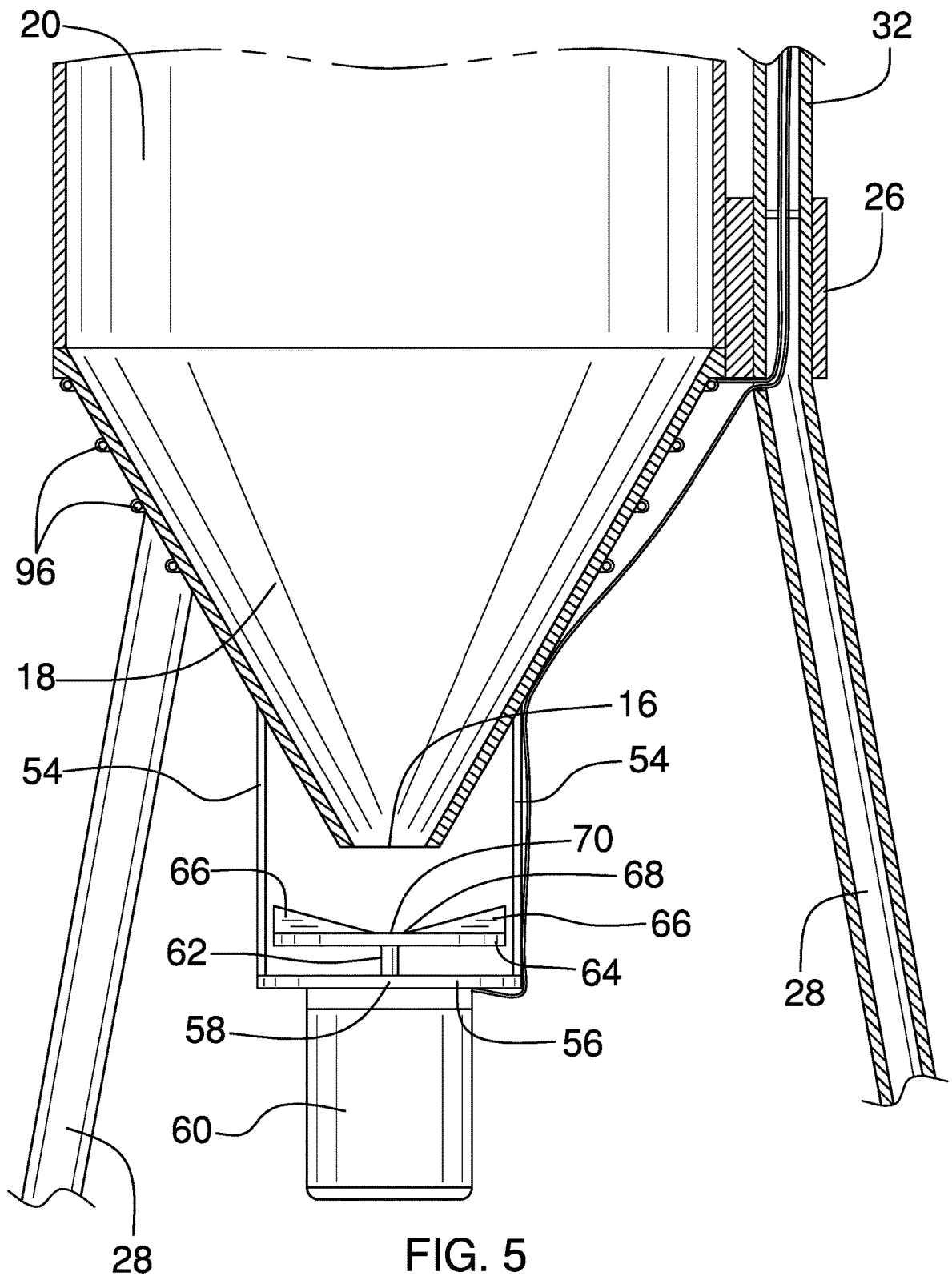

FIG. 2 is a front view of an embodiment of the disclosure.
FIG. 3 is a side view of an embodiment of the disclosure.
FIG. 4 is a top view of an embodiment of the disclosure.
FIG. 5 is a cross-sectional view of an embodiment of the disclosure.

DETAILED DESCRIPTION OF THE INVENTION

With reference now to the drawings, and in particular to FIGS. 1 through 5 thereof, a new baiting assembly embodying the principles and concepts of an embodiment of the disclosure and generally designated by the reference numeral 10 will be described.

As best illustrated in FIGS. 1 through 5, the wildlife baiting assembly 10 generally comprises a cylinder 12 that has a top 14 and a bottom 16. The top 14 and the bottom 16 are open. The cylinder 12 is tapered proximate to the bottom 16 and defines a cone 18 and a reservoir 20. The top 14 is configured to insert feed into the reservoir 20. In one embodiment, the cylinder 12 is substantially circularly shaped when viewed longitudinally.

A base 22 is coupled to and extends from the cylinder 12. The base 22 is positioned to elevate the cylinder 12 above a surface upon which the base 22 is disposed. The base 22 is coupled to the cylinder 12 proximate to a lower end 24 of the reservoir 20. In one embodiment, the base 22 is tripoidal.

The base 22 comprises a set of sockets 26 that is coupled to the cylinder 12. A set of legs 28 is positioned singly in the sockets 26. The legs 28 are coupled to and extend angularly from the cylinder 12.

The assembly 10 comprises a lid 34 that is complementary to the top 14. The lid 34 is reversibly couplable to the cylinder 12 to close the top 14. A coupler 36 is coupled to a perimeter 38 of the lid 34. A pole 32 is coupled to and extends from a respective socket 26 to the coupler 36. The pole 32 is rotationally coupled to the coupler 36. The coupler 36 is positioned to couple to the pole 32 to rotationally couple the lid 34 to the pole 32. A rod 40 is coupled to the lid 34 and extends perpendicularly from the perimeter 38 of the lid 34. The rod 40 is opposingly positioned on the perimeter 38 relative to the coupler 36. A tube 42 is coupled to the cylinder 12. The tube 42 is complementary to the rod 40. The tube 42 is positioned to couple to the rod 40 to couple the lid 34 to the cylinder 12 to close the top 14.

A plurality of feet 44 is coupled singly to and extends radially from the legs 28 distal from the cylinder 12. The feet 44 are configured to stabilize the cylinder 12 relative to the surface upon which the base 22 is disposed. In one embodiment, the feet 44 are substantially circularly shaped.

A battery 46 is coupled to the cylinder 12. The battery 46 is rechargeable. A plurality of solar cells 48 is operationally coupled to the battery 46. The solar cells 48 are positioned to recharge the battery 46. In one embodiment, the battery 46 is positioned proximate to the top 14 of the cylinder 12 on an exterior 50 of the cylinder 12. In another embodiment, the solar cells 48 are coupled to and substantially cover the lid 34.

A disbursing unit 52 is coupled to the cylinder 12 and is positioned below the cone 18. The disbursing unit 52 is operationally coupled to the battery 46. The disbursing unit 52 is configured to broadcast the feed that drops from the cylinder 12 to an area proximate to the base 22, at specified intervals and for specified lengths of time.

In one embodiment, the disbursing unit 52 comprises a pair of arms 54 that is coupled to and extends from the cylinder 12. The arms 54 are positioned proximate to the bottom 16. A first plate 56 is coupled to and extends between the arms 54. The first plate 56 is circularly shaped. A hole 58 is axially positioned through the first plate 56. A motor 60 is coupled to the first plate 56 such that a shaft 62 of the motor 60 protrudes through the hole 58 and extends toward the cylinder 12. A second plate 64 is axially coupled to the shaft 62 distal from the motor 60. The motor 60 is positioned to rotate the second plate 64. A plurality of ribs 66 is coupled to and extends from an upper face 68 of the second plate 64. The ribs 66 are configured to impact the feed as the feed drops from the cone 18 to the second plate 64. The feed is broadcast to the area proximate to the base 22. In another embodiment, the ribs 66 are cuneately shaped. In yet another embodiment, the plurality of ribs 66 comprises four ribs 66 that extend axially from a center 70 of the second plate 64.

A cage 72 is coupled to and extends from the bottom 16 of the cylinder 12. The cage 72 is positioned around the disbursing unit 52. The cage 72 is meshed. The cage 72 is configured to prevent varmints from accessing the feed that is positioned on the second plate 64. In one embodiment, the cage 72 is substantially cylindrically shaped.

A controller 74 is coupled to the cylinder 12. The controller 74 is operationally coupled to the disbursing unit 52. The controller 74 is positioned to compel the disbursing unit 52 to broadcast the feed that drop from the cylinder 12 to the area proximate to the base 22, at the specified intervals and the for specified lengths of time.

In one embodiment, the controller 74 comprises a housing 76 that defines an interior space 78. The housing 76 is coupled to the exterior 50 of the cylinder 12. A microprocessor 80 and a timer 82 are coupled to the housing 76 and are positioned in the interior space 78. The microprocessor 80 is operationally coupled to the battery 46. The timer 82 is operationally coupled to the microprocessor 80. A control panel 84 is coupled to an external face 86 of the housing 76. The control panel 84 is operationally coupled to the microprocessor 80. The control panel 84 is configured to input commands into the microprocessor 80.

A plurality of sensors 88 is coupled to the cylinder 12. The sensors 88 are operationally coupled to the battery 46. The sensors 88 are configured to detect motion proximate to the cylinder 12. In one embodiment, the sensors 88 are operationally coupled to the microprocessor 80. The microprocessor 80 is positioned to compel the sensors 88 to activate.

In another embodiment, the housing 76 is opposingly positioned on the cylinder 12 relative to the battery 46. In yet another embodiment, the plurality of sensors 88 comprises four sensors 88 that are equally distributed around a circumference 90 of the cylinder 12 proximate to the lower end 24 of the reservoir 20.

A plurality of cameras 92 is coupled to the cylinder 12. The cameras 92 are operationally coupled to the microprocessor 80. The microprocessor 80 is positioned to compel the cameras 92 to capture images of scenes proximate to the cylinder 12. In one embodiment, the plurality of cameras 92 comprises four cameras 92 that are equally distributed around the circumference 90 of the cylinder 12 proximate to the lower end 24 of the reservoir 20.

A plurality of lights 94 is coupled to the cylinder 12. The lights 94 are operationally coupled to the microprocessor 80. The microprocessor 80 is positioned to compel the lights 94 to illuminate the area proximate to the cylinder 12. In one embodiment, the lights 94 comprise light emitting diodes 96. In another embodiment, the lights 94 are positioned on the cone 18.

The present invention also anticipates the controller 74 comprising a transceiver. The transceiver would be configured to communicate wirelessly with a remote device, such as a remote control or a smart phone. The user would be enabled to enter commands remotely to compel the microprocessor 80 to compel the cameras 92 to capture the images and the lights 94 to illuminate the area proximate to the cylinder 12. The user also would be enabled to remotely enter commands into the microprocessor 80 to compel the disbursing unit 52 to broadcast the feed at the specified intervals and the for specified lengths of time.

In use, the top 14 is configured to insert the feed into the reservoir 20. The coupler 36 is positioned to couple to the pole 32 to rotationally couple the lid 34 to the pole 32. The tube 42 is positioned to insert the rod 40 to couple the lid 34 to the cylinder 12 to close the top 14. The base 22 is positioned to elevate the cylinder 12 above the surface upon which the base 22 is disposed. The disbursing unit 52 is configured to broadcast the feed that drops from the cylinder 12. The controller 74 is positioned to compel the disbursing unit 52 to broadcast the feed that drops from the cylinder 12 to the area proximate to the base 22, at the specified intervals and the for specified lengths of time. The sensors 88 are configured to detect motion proximate to the cylinder 12. The microprocessor 80 is positioned to compel the cameras 92 to capture the images of the scenes proximate to the cylinder 12. The microprocessor 80 also is positioned to compel the lights 94 to illuminate the area proximate to the cylinder 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:
1. A wildlife baiting assembly comprising:
   a cylinder having a top and a bottom, said top and said bottom being open, said cylinder being tapered proximate to said bottom defining a cone and a reservoir, said cylinder being substantially circular shaped when viewed longitudinally;
   a base coupled to and extending from said cylinder, said base being coupled to said cylinder proximate to a lower end of said reservoir,
   a base coupled to and extending from said cylinder, said base being tripoidal, said base comprising
      a set of sockets coupled to said cylinder, and
      a set of legs positioned singly in said sockets such that said legs are coupled to and extend angularly from said cylinder;
   a lid complementary to said top, said lid being reversibly couplable to said cylinder to close said top;
   a coupler coupled to a perimeter of said lid;
   a pole coupled to and extending from a respective said socket to said coupler, said pole being rotationally coupled to said coupler;
   a rod coupled to said lid and extending perpendicularly from said perimeter of said lid, said rod being opposingly positioned on said perimeter relative to said coupler;
   a tube coupled to said cylinder, said tube being complementary to said rod, wherein said coupler is positioned on said lid such that said coupler is positioned to couple to said pole to rotationally couple said lid to said pole, wherein said tube is positioned on said cylinder such that said tube is positioned for inserting said rod to couple said lid to said cylinder to close said top;
   a battery coupled to said cylinder, said battery being rechargeable;
   a plurality of solar cells operationally coupled to said battery such that said solar cells are positioned for recharging said battery;
   a disbursing unit coupled to said cylinder and positioned below said cone, said disbursing unit being operationally coupled to said battery;
   a plurality of sensors coupled to said cylinder, said sensors being operationally coupled to said battery, said sensors being configured for detecting motion proximate to said cylinder; and
   wherein said top is positioned on said cylinder such that said top is configured for inserting feed into said reservoir, wherein said base is positioned on said cylinder such that said base is positioned to elevate said cylinder above a surface upon which said base is disposed, wherein said disbursing unit is positioned on said cylinder such that said disbursing unit is configured for broadcasting the feed dropping from said cylinder to an area proximate to said base at specified intervals and for specified lengths of time, and wherein said sensors are configured for detecting motion proximate to said base and said cylinder.

2. The assembly of claim 1, further including a plurality of feet, said feet being coupled singly to and extending radially from said legs distal from said cylinder, said feet being substantially circularly shaped, wherein said feet are positioned on said legs such that said feet are configured for stabilizing said cylinder relative to the surface upon which said base is disposed.

3. The assembly of claim 1, further including said battery being positioned proximate to said top of said cylinder on an exterior of said cylinder.

4. The assembly of claim 1, further including said solar cells being coupled to and substantially covering said lid.

5. The assembly of claim 1, further including said disbursing unit comprising:
   a pair of arms coupled to and extending from said cylinder, said arms being positioned proximate to said bottom;
   a first plate coupled to and extending between said arms, said first plate being circularly shaped;
   a hole axially positioned through said first plate,
   a motor coupled to said first plate such that a shaft of said motor protrudes through said hole and extends toward said cylinder;
   a second plate axially coupled to said shaft distal from said motor, wherein said second plate is positioned on said shaft such that said motor is positioned for rotating said second plate;
   a plurality of ribs coupled to and extending from an upper face of said second plate, said ribs being cuneately shaped, said plurality of ribs comprising four said ribs extending axially from a center of said second plate; and
   wherein said ribs are positioned on said second plate such that said ribs are configured for impacting the feed as the feed drops from said cone to said second plate, such that the feed is broadcast to the area proximate to said base.

6. The assembly of claim 5, further including a cage coupled to and extending from said bottom of said cylinder such that said cage is positioned around said disbursing unit, said cage being meshed, wherein said cage is positioned on said cylinder such that said cage is configured for preventing varmints from accessing the feed positioned on said second plate, said cage being substantially cylindrically shaped.

7. The assembly of claim 1, further including a controller coupled to said cylinder, said controller being operationally coupled to said disbursing unit, wherein said controller is positioned on said cylinder such that said controller is positioned to compel said disbursing unit to broadcast the feed dropping from said cylinder to the area proximate to said base at the specified intervals and for the specified lengths of time.

8. The assembly of claim 7, further including said controller comprising:
   a housing defining an interior space, said housing being coupled to an exterior of said cylinder, said housing being opposingly positioned on said cylinder relative to said battery;
   a microprocessor coupled to said housing and positioned in said interior space, said microprocessor being operationally coupled to said battery;
   a timer coupled to said housing and positioned in said interior space, said timer being operationally coupled to said microprocessor;
   a control panel coupled to an external face of said housing, said control panel being operationally coupled to said microprocessor; and
   wherein said control panel is positioned on said housing such that said control panel is configured for inputting commands into said microprocessor.

9. The assembly of claim 8, further including said sensors being operationally coupled to said microprocessor, wherein said sensors are positioned on said cylinder such that said microprocessor is positioned to compel said sensors to activate such that said sensors are configured for detecting motion proximate to said cylinder.

10. The assembly of claim 9, further including said plurality of sensors comprising four said sensors equally distributed around a circumference of said cylinder proximate to said lower end of said reservoir.

11. The assembly of claim 8, further including a plurality of cameras coupled to said cylinder, said cameras being operationally coupled to said microprocessor, wherein said cameras are positioned on said cylinder such that said microprocessor is positioned to compel said cameras to capture images of scenes proximate to said cylinder.

12. The assembly of claim 11, further including said plurality of cameras comprising four said cameras equally distributed around said circumference of said cylinder proximate to said lower end of said reservoir.

13. The assembly of claim 8, further including a plurality of lights coupled to said cylinder, said lights being operationally coupled to said microprocessor, wherein said lights are positioned on said cylinder such that said microprocessor is positioned to compel said lights to illuminate an area proximate to said cylinder.

14. The assembly of claim 13, further including said lights comprising light emitting diodes, said lights being positioned on said cone.

15. A wildlife baiting assembly comprising:
    a cylinder having a top and a bottom, said top and said bottom being open, said cylinder being tapered proximate to said bottom defining a cone and a reservoir, wherein said top is positioned on said cylinder such that said top is configured for inserting feed into said reservoir, said cylinder being substantially circularly shaped when viewed longitudinally;
    a base coupled to and extending from said cylinder, wherein said base is positioned on said cylinder such that said base is positioned to elevate said cylinder above a surface upon which said base is disposed, said base being coupled to said cylinder proximate to a lower end of said reservoir, said base being tripoidal, said base comprising:
        a set of sockets coupled to said cylinder, and
        a set of legs positioned singly in said sockets such that said legs are coupled to and extend angularly from said cylinder;
    a lid complementary to said top, said lid being reversibly couplable to said cylinder to close said top;
    a coupler coupled to a perimeter of said lid;
    a pole coupled to and extending from a respective said socket to said coupler, said pole being rotationally coupled to said coupler;
    a rod coupled to said lid and extending perpendicularly from said perimeter of said lid, said rod being opposingly positioned on said perimeter relative to said coupler;
    a tube coupled to said cylinder, said tube being complementary to said rod, wherein said tube is positioned on said cylinder such that said tube is positioned for inserting said rod to couple said lid to said cylinder to close said top;
    a plurality of feet, said feet being coupled singly to and extending radially from said legs distal from said cylinder, said feet being substantially circularly shaped, wherein said feet are positioned on said legs such that said feet are configured for stabilizing said cylinder relative to the surface upon which said base is disposed;
    a battery coupled to said cylinder, said battery being rechargeable, said battery being positioned proximate to said top of said cylinder on an exterior of said cylinder;
    a plurality of solar cells operationally coupled to said battery such that said solar cells are positioned for recharging said battery, said solar cells being coupled to and substantially covering said lid;
    a disbursing unit coupled to said cylinder and positioned below said cone, said disbursing unit being operationally coupled to said battery, wherein said disbursing unit is positioned on said cylinder such that said disbursing unit is configured for broadcasting the feed dropping from said cylinder to an area proximate to said base at specified intervals and for specified lengths of time, said disbursing unit comprising:
        a pair of arms coupled to and extending from said cylinder, said arms being positioned proximate to said bottom,
        a first plate coupled to and extending between said arms, said first plate being circularly shaped,
        a hole axially positioned through said first plate,
        a motor coupled to said first plate such that a shaft of said motor protrudes through said hole and extends toward said cylinder,
        a second plate axially coupled to said shaft distal from said motor, wherein said second plate is positioned on said shaft such that said motor is positioned for rotating said second plate, and
        a plurality of ribs coupled to and extending from an upper face of said second plate, wherein said ribs are positioned on said second plate such that said ribs are configured for impacting the feed as the feed drops from said cone to said second plate, such that the feed is broadcast to the area proximate to said base, said ribs being cuneately shaped, said plurality of ribs comprising four said ribs extending axially from a center of said second plate;
    a cage coupled to and extending from said bottom of said cylinder such that said cage is positioned around said disbursing unit, said cage being meshed, wherein said cage is positioned on said cylinder such that said cage is configured for preventing varmints from accessing the feed positioned on said second plate, said cage being substantially cylindrically shaped;
    a controller coupled to said cylinder, said controller being operationally coupled to said disbursing unit, wherein said controller is positioned on said cylinder such that said controller is positioned to compel said disbursing unit to broadcast the feed dropping from said cylinder to the area proximate to said base at the specified intervals and for the specified lengths of time, said controller comprising:
        a housing defining an interior space, said housing being coupled to said exterior of said cylinder, said housing being opposingly positioned on said cylinder relative to said battery,
        a microprocessor coupled to said housing and positioned in said interior space, said microprocessor being operationally coupled to said battery,
        a timer coupled to said housing and positioned in said interior space, said timer being operationally coupled to said microprocessor, and
        a control panel coupled to an external face of said housing, said control panel being operationally coupled to said microprocessor, wherein said control panel is positioned on said housing such that said control panel is configured for inputting commands into said microprocessor;
    a plurality of sensors coupled to said cylinder, said sensors being operationally coupled to said battery, said sensors being configured for detecting motion proximate to said cylinder, said sensors being operationally coupled to said microprocessor, wherein said sensors are positioned on said cylinder such that said microprocessor is positioned to compel said sensors to activate such that said sensors are configured for detecting motion proximate to said cylinder, said plurality of sensors comprising four said sensors equally distributed around a circumference of said cylinder proximate to said lower end of said reservoir;

a plurality of cameras coupled to said cylinder, said cameras being operationally coupled to said microprocessor, wherein said cameras are positioned on said cylinder such that said microprocessor is positioned to compel said cameras to capture images of scenes proximate to said cylinder, said plurality of cameras comprising four said cameras equally distributed around said circumference of said cylinder proximate to said lower end of said reservoir;

a plurality of lights coupled to said cylinder, said lights being operationally coupled to said microprocessor, wherein said lights are positioned on said cylinder such that said microprocessor is positioned to compel said lights to illuminate the area proximate to said cylinder, said lights comprising light emitting diodes, said lights being positioned on said cone; and wherein said top is positioned on said cylinder such that said top is configured for inserting feed into said reservoir, wherein said coupler is positioned on said lid such that said coupler is positioned to couple to said pole to rotationally couple said lid to said pole, wherein said tube is positioned on said cylinder such that said tube is positioned for inserting said rod to couple said lid to said cylinder to close said top, wherein said base is positioned on said cylinder such that said base is positioned to elevate said cylinder above the surface upon which said base is disposed, wherein said disbursing unit is positioned on said cylinder such that said disbursing unit is configured for broadcasting the feed dropping from said cylinder, wherein said controller is positioned on said cylinder such that said controller is positioned to compel said disbursing unit to broadcast the feed dropping from said cylinder to the area proximate to said base at the specified intervals and for the specified lengths of time, wherein said sensors are configured for detecting motion proximate to said cylinder, wherein said cameras are positioned on said cylinder such that said microprocessor is positioned to compel said cameras to capture the images of the scenes proximate to said cylinder, wherein said lights are positioned on said cylinder such that said microprocessor is positioned to compel said lights to illuminate the area proximate to said cylinder.

* * * * *